United States Patent [19]

Jessop, III

[11] 4,026,243

[45] May 31, 1977

[54] AQUARIUMS

[76] Inventor: Quenton W. Jessop, III, 2351 Spruce St., Carlsbad, Calif. 92008

[22] Filed: July 17, 1975

[21] Appl. No.: 596,919

[52] U.S. Cl. .................................... 119/5; 47/69
[51] Int. Cl.² ............... A01K 63/00; A01K 64/00
[58] Field of Search ........... 119/5; 240/2 LC; 47/38

[56] References Cited

UNITED STATES PATENTS

| 46,801 | 3/1865 | Ivers ............................... 119/5 |
| 465,516 | 12/1891 | Berger et al. .................. 119/5 X |
| 1,574,783 | 3/1926 | Beth ................................ 119/5 |
| 1,803,571 | 5/1931 | Ulman ........................ 240/2 LC |
| 2,072,185 | 3/1937 | Schein ............................ 47/38 |
| 2,306,027 | 12/1942 | Swaney .......................... 47/38 |
| 3,576,426 | 4/1971 | Sesholtz ...................... 119/5 X |

Primary Examiner—Hugh R. Chamblee
Attorney, Agent, or Firm—Duane C. Bowen

[57] ABSTRACT

Aquarium having contained, shielded, integrated service unit directly or indirectly lighted achieving lighting effects, including pump and air outlet from pump producing light reflecting bubbles, including a heater and filter, and superposed to a terrarium for feeding, by gravity flow, water and food and fish wastes to the terrarium. Bulbous shaped terrarium, aquarium and/or light enclosure is in superposed arrangement, hung from a chain or the like.

23 Claims, 7 Drawing Figures

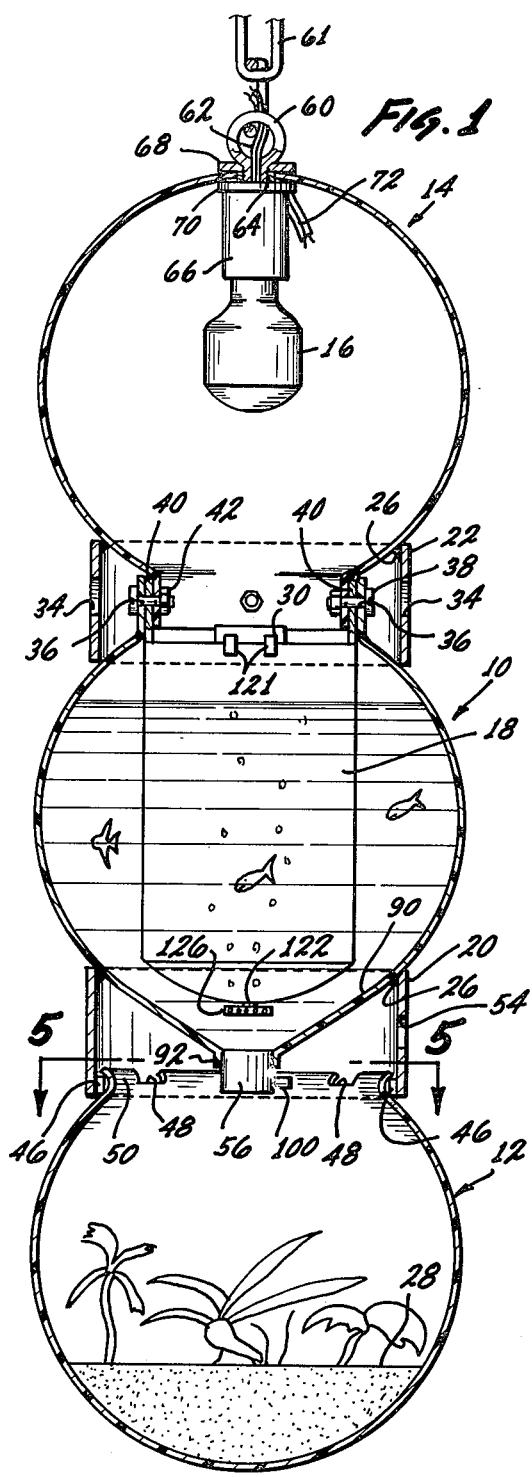

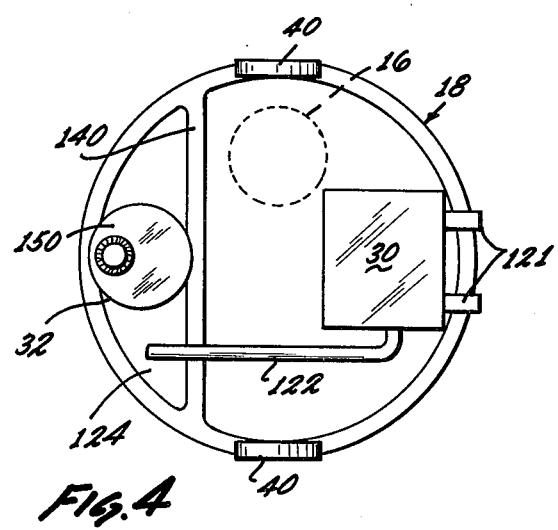
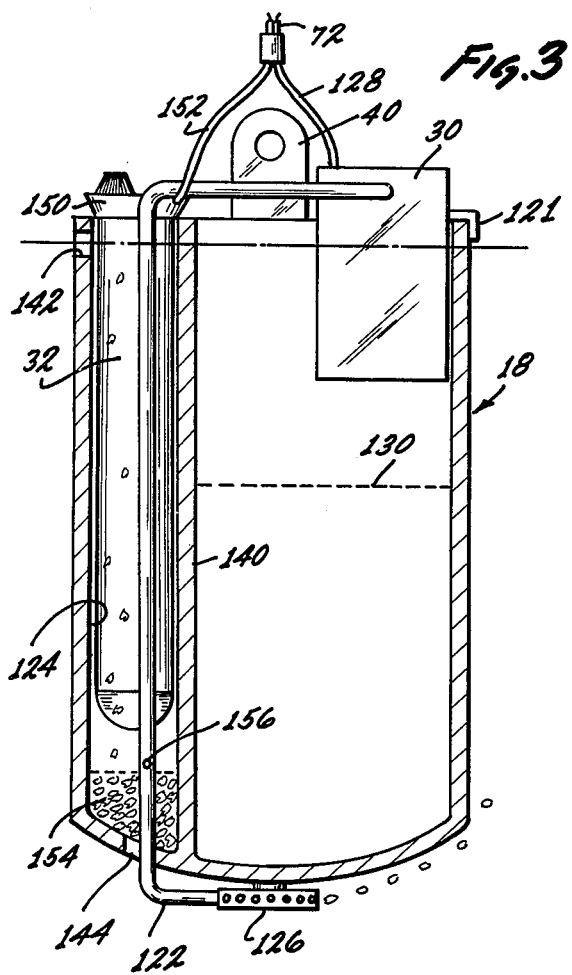
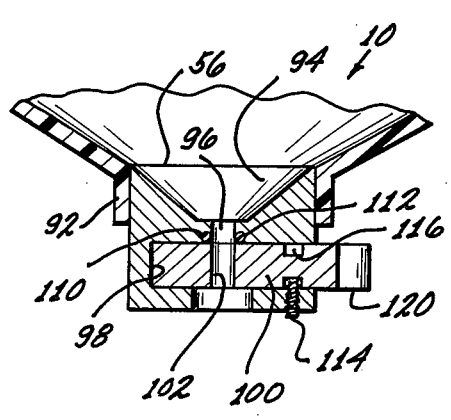
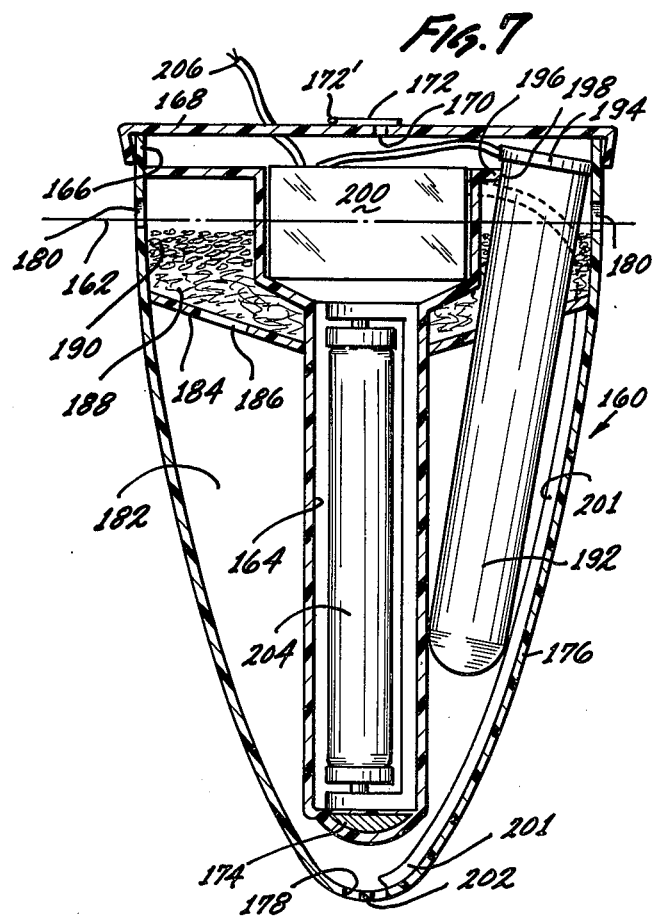

AQUARIUMS

BRIEF SUMMARY OF THE INVENTION AND OBJECTIVES

My invention relates to aquariums improved as to appearance and service, that may be ecologically related to terrariums.

Aquariums require or commonly have certain service apparatus such as lights, air pumps, heaters and filters and, as far as I know, these have been manufactured as separate units and have been installed separately. I believe the present practice is unattractive in which such units are installed, unshielded, at various locations in or on the aquarium. Objectives of my invention include integrating all or part of such units in a common body, shielding unattractive units, and achieving decorative effects relative to lighting and air bubbles.

Aquariums and terrariums have several aspects, including: (a) decorative functions, (b) educational and interest functions as to fish life and as to plant life, and (c) care and maintenance of the environments of the fish and plants as to health and appearance. Another objective of my invention is to provide a combined aquarium and terrarium which represents an improvement relating to appearance, including providing attractive shapes and shielding joinder areas, providing lighting effects, and preferably providing the form of a hanging assembly. Another objective is to provide a design of educational and other interest as to ecological considerations, i.e., by utilizing waste from the aquarium in the terrarium. A further objective is to provide a design taking into consideration maintenance matters, particularly relating to aquarium cleaning and waste disposal.

Other objectives include: (a) to provide a low weight product, particularly for hanging, (b) to devise a structure economically producible, and (c) to provide for aquarium heating and air supply in an attractive and functional manner and to integrate filtering.

My invention will be best understood, together with additional advantages and objectives thereof, from the following description, read with reference to the drawings, in which:

FIG. 1 is a side view, partly in section, of a specific embodiment of my invention.

FIG. 2 is a view similar to FIG. 1 but modified by providing the light in the aquarium rather than in a separate enclosure.

FIG. 3 is an enlarged side view, partly in section, of the inner central container in the aquarium.

FIG. 4 is a top view of the structure viewed in FIG. 3, except that FIG. 4 can be taken as following FIG. 2 by including a light bulb and FIG. 3 can be taken as following FIG. 1 by not including a light bulb within the central container.

FIG. 5 is an enlarged view, partly in section, taken on line 5—5 of FIG. 1.

FIG. 6 is an enlarged, fragmentary side view, partly in section, showing the aquarium outlet valve means.

FIG. 7 is a side view, partly in section, of an integrated aquarium service unit.

In the preferred configuration an aquarium 10 is superposed to a terrarium 12 and a light enclosure 14 is superposed to aquarium 10. In FIG. 1 I have illustrated the nature of these containers by showing soil and plants in terrarium 12, fish and water in aquarium 10, and a light bulb 16 in light enclosure 14. FIG. 2 is different in eliminating enclosure 14 and by placing light bulb 16 in the central, generally cylindrical inner container 18 in aquarium 10. The area of joinder between terrarium 12 and aquarium 10 is concealed from the side by collar 20. In the FIG. 1 structure which also includes lighting enclosure 14, a second collar 22 conceals from the side the area of joinder of aquarium 10 and lighting enclosure 14.

It is preferred to form aquarium 10, terrarium 12 and enclosure 14 as bulbous shapes, i.e., they could be or could be termed spherical, globular, ellipsoidal, oviform or even have multiple planar surfaces, i.e., octagonal. The point is that they are generally annular in horizontal cross-section and the word "bulbous" seems to be a good generic expression for them. Although of course cubical shapes or the like could be used, such is not preferred because the appearance is thought to be inferior, fabrication could be more difficult, a self-cleansing function in the aquarium would not work as well, etc. It would be possible to hang the assembly against a wall, in which case the forms would be semi-spherical, etc. The aquarium, terrarium and light housing could be of glass but plastic is the preferred material because of easier fabrication both in general and as to openings, etc. Collars 20, 22 may be of plastic but metal would be also applicable. The collars are preferably formed of opaque material as their function is to conceal joinder areas from side view, as the joinder mechanisms could be thought of as detracting from appearance. Otherwise the abutment of bulbous shapes could be thought of as being as attractive without collars as with collars. Collar 20 may be bonded to aquarium 10 and collar 22 may be bonded to enclosure 14 by an adhesive material, indicated at 26.

Aquarium 10 obviously should be formed of transparent material. This is also true of terrarium 12 at least as to areas above the soil level 28. Visibility of the soil may not thought to be objectionable but, if it is considered undesirable, the lower portion of terrarium 12 below plane 28 can be made translucent or opaque in a number of ways, i.e., forming from a different material and suitably joining to the upper section, coating or covering the lower portion, etc. I prefer that light enclosure 14 be formed of translucent material. By this I mean a material transmitting light but being less than transparent, so that light from bulb 16 will not be too bright to the eyes. This can be achieved by an obscuring color, by a "frosted" effect, etc. Use of such translucent material in bulb housings, for the same reason, is common and does not need more explanation. Enclosure 14 could be opaque, in which case light would come indirectly through aquarium 10 and particularly if inner container 18 were translucent, and that would be an optional approach, dealing with decorative effect, but the provision of enclosure 14 would make more sense if it were used for direct lighting. Vents in enclosure 16 for hot air from bulb 16 can be provided.

The logic of bulb 16 being positioned in inner container 18 is that container 18 would not be opaque, unless, again, indirect lighting were desired. As inner container 18 is shown to contain a pump 30 and a water heater 32, one function of container 18 can be to conceal these objects, in which case container 18 should be opaque or translucent. An opaque container would be appropriate in the FIG. 1 assembly, although a different appearance would be obtained by light shining through it from bulb 16 above if container 18 were translucent, either colored or essentially white. In the FIG. 2 configuration, again, usually container 18 would be translucent and different effects will be obtained if the container is frosted or essentially white or if the container is given a color.

In FIG. 1, collar 22 and aquarium 10 are shown as having at least one set of registering openings 34, 36 to permit addition of water to the aquarium. Other openings 34 are provided to supply access to two or more bolt assemblies 38 that are used to secure aquarium 10 to light enclosure 14 by passing through registering openings. Container 18 may be secured in place by having lugs 40 interposed between light enclosure and aquarium surfaces (and having matching openings) so as to be secured by the same bolt assemblies 38. As there is no access to the inner ends of the bolt assemblies 38 during joinder, nuts 42 can be bonded in place, against turning, so that access is needed only to the heads of the bolts.

Terrarium 12 is shown to be secured to aquarium 10 in the same manner in both FIG. 1 and FIG. 2 (see also FIG. 5). Collar 20 has secured to its inner surface a series of protruding lugs 46 which mate with notches 48 in an out-turned lip 50 of terrarium 12. It will be understood that turning of terrarium 12 will latch or unlatch relative to collar 20. Collar 20 has at least one opening 54 for adding water directly to terrarium 12 or for access to the valve 56 used for adding liquid from the aquarium to the terrarium, a feature that will be described in more detail later.

Container 18 is shown as being generally cylindrical, which is a suitable shape. One function it has is to reduce the water volume in aquarium 10, i.e., the water space is the annular space around container 18 and the space underneath. Reduction of water means substantial reduction of weight, which is particularly important in a hanging assembly. The reduction in space does not reduce the fish viewing area circumferentially of aquarium 10, although it does reduce the depth of viewing, i.e., fish cannot swim in the center of the aquarium shape.

The aquarium usually will be hung by a chain 61 attached to an eye 60 and having an electrical supply cord woven into the chain and entering the assembly through a hollow sleeve 64, the cord 62 and the sleeve 64 extending through appropriate holes. Eye 60 and socket 66 for bulb 16 have facing end abutments 68, 70. This structure and the method of securing together the same can follow common lighting fixture practices, i.e., a suitable usual expedient would be to have sleeve 64 threaded and have eye piece 60 threadedly engage sleeve 64. Special adaptation of members 66, 70 may be required in the FIG. 2 construction of bulb 16 in off-center position as shown in FIG. 4. A second electrical cord 72 can extend from socket assembly 66 to connect to pump 30 and heater 32. Suitable clips (not shown) can be used to keep cord 72 out of contact with bulb 16.

In the FIG. 1 construction, light enclosure 14 can have an opening to accept sleeve 64. In the FIG. 2 construction, access is needed for installation of container 18 and to pump 30 and heater 32. I have shown this as taking the form of a curved top plate 80 that can be made of metal or of the same material that is used to form aquarium 10. Matching openings in plate 80 and aquarium 10 receive bolts 82. As the bolts have to be installed without interior access, nuts 84 can be bonded to the interior of aquarium 10 with the heads 86 on the outside. A vent 88 in plate 80 can be used for resupply of water to aquarium 10, i.e., with a syringe so as to direct the water to the side of container 18. Whereas container 18 can be hung in the FIG. 1 construction, as previously detailed, that is harder to achieve in the FIG. 2 construction and a different solution shown is to support container 18 on feet 89 that can be bonded to the bottom of container 18.

As indicated previously, one idea of my combined aquarium and terrarium is to demonstrate a ecological relationship, namely that what is waste to the aquarium is needed by the terrarium. The lower portion 90 of aquarium 10 is preferably generally conical in shape so that solids will bend to descend or funnel to the outlet of the aquarium rather than to collect on the inner walls of the aquarium to require more often water replacement and aquarium wall cleaning. The funneling function of lower aquarium portion 90 will bend to direct food and fish wastes to the aquarium outlet, to be periodically drained by gravity into terrarium 12, thereby providing moisture and nutrition to the terrarium.

The valve or closure 56 can be bonded in a neck 92 of aquarium 10. The outer surface of valve 56 can be cylindrical, the upper surface 94 can be generally conical, leading to a bottom port 96. A side bore 98 will accept a cylindrical valve piece or spool with a bore 102 that can be brought into registry with port 96 through rotary adjustment of valve piece 100 or can be turned to seal port 96. In order to prevent leakage of water past valve piece 100, an O-ring 110 is fitted into a counterbore 112, around port 96. Valve piece 100 is held in place by a set screw 114 fitting in an annular groove 116 in valve piece 100. The outer end of valve piece 100 has a slot 120 so that it can be turned with a knife, screwdriver or the like by access through opening 54. A special bladed instrument could be provided with the apparatus for this purpose but that appears to be an unnecessary added expense as tools available in a household could be used. Water and waste from aquarium 10 would be discharged periodically into terrarium 12 depending on the needs of the terrarium and the collection of waste in the aquarium. Note that valve piece 100 is located interiorly so that it will not be opened inadvertently, as by children examining the aquarium-terrarium.

In addition to its function to reduce the water capacity and weight of aquarium 10, inner central container 18 houses pump 30 and heater 32, and also encloses bulb 16 in the FIG. 2 construction. The lighting aspect of container 18 already has been reviewed, i.e., normally it should not be transparent as it should conceal heater 32 and pump 30 as they do not enhance the appearance of an aquarium but the container 18 should be translucent (shades of white or color or frosted) for lamp-type lighting in the FIG. 2 construction and may be optionally translucent in the FIG. 1 construction for a lighting effect.

Pump 30 may be hung on a wall of container 18 at the top portion, as by the bracket 121. An airline 122 for discharge of air into aquarium, for supply of oxygen for fish, may pass through a side compartment 124 to discharge in an air outlet ring 126 at the center of the bottom of container 18. This location is preferred because the air bubbles will ascend on all sides of container 18, thereby achieving an attractive effect. A branch 128 of electrical conduit 72 connects to pump 30 from above. Of course it is essential that there be no possibility of electrical conduction to water in aquarium 10, i.e., in the circumstance that aquarium 10 were overfilled or leaked. Avoidance of this hazard is achieved by the function of the empty space in container 18 to accept, by flooding, aquarium overflow or container leakage. Dashed line 130 in FIG. 3 represents the common water level of aquarium 10 and container 18 should the container leak, for example. The location of line 130 will depend on the relative capacities of container 18 and the annular water space in the aquarium around container 18, but the line 130 illustrates that it is easy to provide a rather low common water line 130 well below pump 30 and especially way below the electrical lead 128 to pump 30. In the FIG. 2 construction where container 18 must have room for a light bulb, the components must be sized and arranged so that there is room for bulb 16, as shown in FIG. 4, with bulb 16 spaced sufficiently from other components so that there is no problem of overheating such other components by bulb 16, but this can be accommodated as demonstrated in FIG. 4, although the socket 66, 70 structure may have to be adapted to locate bulb 16 off-center.

A watertight partition 140 in chordal disposition is used to form compartment 124. Water inlet and outlet openings are provided to compartment 124, including at least an upper opening 142 and a lower or bottom opening 144 (through which pump airline 122 can pass), so that water can circulate therethrough from aquarium 10. The primary function of compartment 124 is to house heater 32, in order to conceal the heater but permit the heater to have its normal use of sensing water temperatures and heating water responsively. Openings 142, 144 and possibly additional openings should be adequate to circulate water so that water temperature sensing and water heating can be accommodated, i.e., if water circulation were inadequate then the sensing of water temperatures in compartment 124 and the heating of water therein would not be sufficiently related to general aquarium water temperatures for operation. As water circulation and the like is dependent on the size of compartment 124 and the amount of openings 142, 144, the question is one of dimensioning and not of operability, i.e., the outer wall of compartment 124 could be perforated with many openings if necessary and would still obscure viewing of heater 32.

The model of heater shown has a large upper portion 150, so that it can be supported merely by resting on the top of adjacent walls of container 18 and partition 140, although special support brackets could be provided. Note that the electrical lead 152 is to the top of heater 32 and the electrical connection is guarded against conduction to water due to overfilling of aquarium 10 by flooding of container 18, as discussed in connection with pump 30 as to the common water line 130 shown in FIG. 3. Line 130 represents the common water level of container 18 and aquarium 10 in case of container leakage relative to pump 130. Line 130 only indirectly pertains to overfilling of aquarium 10 by showing capacity, which is the consideration in protecting heater 32 from electrical shortage. Any overfilling should not be nearly that extensive, i.e., the user would have to be very careless to get any more than minimal flooding of container 18.

Provision of a filter integrated into container 18 can be a desirable feature and a combination fibrous and charcoal filter 154 is shown in FIG. 3. Note that airline 122 has an opening 156 within compartment 124 which serves two purposes. One purpose is a flow of air bubbles producing attractive illuminating effects that will be particularly noticeable if container 124 is directly rather than indirectly luminated. A second purpose is to induce a greater flow of water through compartment 124. This extra "drive" on the water (in addition to movement due to heating in compartment 124 and in addition to general aquarium water movement due to the air from the ring bubbler 126) is particularly valuable when a filter 154 is used in order to force water through the filter.

It will be understood tht container 18 and the associated lighting, pumping and heating units have utility in aquariums in general, apart from the aquarium and associated configurations of FIGS. 1 and 2. Another configuration like unit 18 is the integrated aquarium service unit 160 shown in FIG. 7. Unit 160 has much in common with unit 18 and unit 160 obviously can be used in the aquariums of FIGS. 1 and 2 and unit 18 can be used in aquariums in general, either supported by a bracket from the side of the aquarium or adapted to float like unit 160.

Service unit 160 can be mounted like container 18 or can be provided with a bracket for side mounting, but service unit 160 is shown to be free-floating with the top above the water level 162 of the aquarium. It has an inner central comprtment 164 which is watertight as to sides and bottom. Compartment 164 is sized so that it will displace enough water so as to support the weight of unit 160 with its upper edge 166 substantially above water level 162 (i.e., a minimum of ½ inch is preferable). A cap 168 is snapped on unit 160 so that water can't splash in, etc. Cap 168 can have one or more ventilating openings 170 that can be closed or adjustably opened by pivoting of a slide closure 172 about a pivot formed by a rivet 172. Such a closure pivoting to close container openings is common and is not detailed, i.e., it can be circular with openings or be a wedge-shaped, circular sector. The purpose of opening 170 and closure 172 is to control the water heating effect of the light source within unit 160, i.e., to the extent the light source heated aquarium water to a temperature too high, unit 160 may need to be vented. Note that the heating requirement of a tropical fish aquarium will vary according to room temperature (which can vary between day and night or at other times), whether it is exposed to sunlight during times in the day, etc. The simple way to manage venting is to set the vent opening at a size giving adequate venting during the times when the aquarium has maximum heating from its environment. As temperatures reduce, the water heater provided in the unit can provide additional heat to maintain minimum water temperature.

Unit 160 must float stably and ballast may be needed, which is shown by a lead weight 174 in the bottom of inner compartment 164.

Service unit 160 has an outer shell 176 with a water ingress opening or openings 178 in its bottom and with water egress openings 180 in its upper portion for circulation of water from opening 178 through the annular space 182 between shell 176 and the walls of inner compartment 164 to openings 180. Partitions 184 with water passages 186 therethrough, support a filtering medium which is shown to include a fibrous filter 188 and a charcoal filter 190. The arrangement of the walls of shell 176 and the walls of compartment 164 is preferably annular in horizontal cross-section, i.e., each is circular in section.

A water heater 192, of conventional type, is disposed in annular space 182. It can be supported by its enlarged diameter head 194 resting on adjacent edges of the walls of compartment 164 and shell 176 but preferably a web 196 therebetween is provided with an opening 198 fitting the body of heater 14 and not passing head 194 so that heater 192 is stably supported.

A pump 200 in the upper portion of compartment 164 can be used to pump air or water or both. An airline 201 extends from pump 200 and discharges near ingress opening 178. A second purpose of vent 170 can be to supply air for pump 200 to the extent there is not enough air available by leakage past cover 168 or by other provision. A web 202 can be provided across ingress opening 178 to which the end of airline 201 can be secured to support it in its preferred position in which air bubbles pass both outside shell 176 and through the annular space 182. The purpose of the airline 201 is primarily for supply of oxygen to the aquarium water but secondary purposes include to enhance circulation of water through annular space 182 to be heated, and to achieve decorative bubble effects by passage inside and outside of the shell 176. The light from the source inside of compartment 164 produces optical effects due to the travel of the air bubbles. The end of airline 201 can provide sufficient bubbles to pass through annular space 182 to achieve the desired results, but an opening like opening 156 an air line 122 (FIG. 3) can be used to bleed extra air to space 182 as an alternative.

For lighting, an elongated incandescent bulb can be used in compartment 164 but FIG. 7 shows the use of a flourescent light assembly 204. A flourescent light will have less problem with aquarium overheating that an incandescent bulb due to lower wattage. The walls of shell 176 and compartment 164 are formed mostly or entirely of translucent material so that light will be provided but the materials obscure viewing sufficiently so that the operating units (light 204, pump 200, filters 188, 190, airline 201 and heater 192) are shielded from view. This means that good lighting is provided, with bubble effects, in a unit with a good appearance and with "hardward" largely concealed.

I have not completely detailed electrical wiring but I have indicated a supply cord 206 passing though a suitable opening in cover 168 and connecting to pump 200 and an electrical branch cord to heater 192. Supply cord 206 should be adequately supported so that it can have no water contact in passing from the floating service unit 160 to a "dry" support. This can take a number of forms, so it is not illustrated, but commonly the aquarium will have a corner (for various reasons including the propensity of some fish to jump out of an uncovered aquarium) and electrical supply cord 206 can pass directly upwardly through an opening in the aquarium cover. Such aquarium cover opening can be independent or can be associated with a door in the aquarium cover used for aquarium access for fish feeding, water replenishment, etc., if the cover itself is not completely removed for such operations. The shell 176 shown has considerable taper from top to bottom so that air bubbles passing along the outside will tend to wipe the shell walls thereby producing somewhat different optical effects than if they passed alongside vertical shell walls.

The foregoing describes the structure of my invention, how it operates, and how the objectives of my invention are met. Having thus described my invention, I do not wish to be understood as limiting myself to the precise structure shown. Instead, I wish to cover those modifications thereof that will occur to those skilled in the art upon learning of my invention and properly within the scope of my invention.

I claim:
1. A combined aquarium-terrarium, comprising:
   a. a terrarium and an aquarium each being a small container made at least partly of transparent material and being closed at least except at its top,
   b. said aquarium having bottom water outlet means through which water may be discharged and an on-off manually operable closure for said outlet means controlling periodic manually operated discharge through said outlet means,
   c. said aquarium being disposed above said terrarium and said outlet means being operable to discharge by force of gravity into said terrarium when said closure is periodically opened, whereby said terrarium will receive water and food and fish waste from said aquarium as a source of moisture and nourishment, and
   d. said aquarium and said terrarium each being generally bulbous shaped, said aquarium being superposed to said terrarium and having a bottom sloping to said water outlet means, said terrarium having an upper end with an opan mouth and the lower end of said aquarium including said outlet means extending into and nesting within said mouth of said terrarium below the plane of the top of said terrarium.

2. The subject matter of claim 1 in which the lower end of said aquarium is generally conical and funneling to said outlet means at the lowermost point in said aquarium whereby food and fish waste will tend to settle around said water outlet means to be discharged into said terrarium upon opening of said closure.

3. The subject matter of claim 1 in which there is an enclosure above said aquarium and attached thereto, said enclosure having an electric light therein whereby a lamp effect is provided, said electric light illuminating said aquarium, said enclosure, aquarium and terrarium having similar shapes and being in superposed series.

4. The subject matter of claim 1 in which said aquarium is annular in horizontal cross-section and in which said aquarium has therein extending down from its upper portion an inner container closed at its bottom whereby the water capacity of said aquarium is the space between said inner container and the walls of said aquarium, said container being annular in horizontal cross-section and being spaced from said walls of said aquarium so that said space is annular in horizontal cross-section.

5. The subject matter of claim 4 in which said aquarium is transparent and said inner container is translucent and an electric light within said inner container whereby a lamp effect is provided.

6. A combined aquarium-terrarium, comprising:
   a. a terrarium and an aquarium,
   b. said aquarium having water outlet means through which water may be discharged and a manually operable closure for said outlet means controlling discharge through said outlet means;
   c. said aquarium being disposed higher than said terrarium and said outlet means being operable to discharge by force of gravity into said terrarium when said closure is opened, whereby said terrarium will receive water and food and fish waste from said aquarium as a source of moisture and nourishment, and d. means attached to said aquarium operative to connect a superposed tension member to support said aquarium in a suspended manner and said terrarium being attached to said aquarium so it can be suspended from said aquarium.

7. The subject matter of claim 6 in which said aquarium and terrarium are each generally bulbous shaped and said terrarium having its upper end formed as an open mouth, said water outlet means being at the bottom of said aquarium to discharge into said open mouth of said terrarium and there being an opaque collar abutted to both said aquarium and said terrarium and extending around said mouth of said terrarium and substantially concealing from side view said water outlet means, said collar having means operative to removably latch said terrarium to said collar.

8. The subject matter of claim 7 in which said collar is bonded to said aquarium and said collar and terrarium having matching fill holes, said means to latch said terrarium to said collar including a plurality of lugs extending inwardly from the inner surface of said collar and said terrarium having an out-turned lip with a plurality of notches mating with said lugs, whereby latching and unlatching of said terrarium to said collar is accomplished by rotary adjustment of said terrarium relative to said collar, the fill hole in said collar also providing access from the side to said manually operable closure.

9. The subject matter of claim 6 in which said aquarium and said terrarium are each generally bulbous shaped, said aquarium having therein extending down from its upper portion an inner central container closed at its bottom whereby the water capacity of said aquarium is the space between inner central container and the walls of said aquarium, said outlet means being at the bottom of said aquarium and said bottom of said central container being spaced above said outlet means.

10. The subject matter of claim 9 in which said aquarium is transparent and said inner container is translucent and an electric light within said inner container whereby a lamp effect is provided 11. The subject matter of claim 9 in which there is an enclosure superposed to said aquarium and attached thereto and said means attached to said aquarium includes said enclosure and attachment means at the top of said enclosure, said enclosure having an electric light therein whereby a lamp effect is provided, said enclosure being bulbous shaped and said enclosure, aquarium and terrarium having the appearance of serial continuity, said enclosure being translucent and said aquarium and at least the upper portion of said terrarium being transparent and an opaque collar between said enclosure and said aquarium and an opaque collar between said aquarium and said terrarium concealing from the side their areas of joinder.

12. A combined aquarium-terrarium, comprising:
a. a terrarium and an aquarium,
b. said aquarium having water outlet means through which water may be discharged and a manually operable closure for said outlet means controlling discharge through said outlet means,
c. said aquarium being disposed higher than said terrarium and said outlet means being operable to discharge by force of gravity into said terrarium when said closure is opened, whereby said terrarium will receive water and food and fish waste from said aquarium as a source of moisture and nourishment,
d. said aquarium having therein extending down from its upper portion an inner container closed at its bottom whereby the water capacity of said aquarium is the space between said inner container and the walls of said aquarium,
e. an enclosure superposed to said aquarium and attached thereto, said enclosure having an electric light therein whereby a lamp effect is provided, and
f. said enclosure, said aquarium and said terrarium being each bulbous shaped and having the appearance of serial continuity, said enclosure being translucent and said aquarium and at least the upper portion of said terrarium being transparent and an opaque collar between said enclosure and said aquarium and an opaque collar between said aquarium and said terrarium concealing from the side their proximate areas.

13. A combined aquarium-terrarium, comprising:
a. a terrarium and an aquarium,
b. said aquarium having water outlet means through which water may be discharged and a manually operable closure for said outlet means controlling discharge through said outlet means,
c. said aquarium being disposed higher than said terrarium and said outlet means being operable to discharge by force of gravity into said terrarium when said closure is opened, whreby said terrarium will receive water and food and fish waste from said aquarium as a source of moisture and nourishment,
d. said aquarium having extending down from its upper portion an inner container closed at its bottom whereby the water capacity of said aquarium is the space between and inner container and the walls of said aquarium, and
e. an air pump disposed in the upper portion of said container and an electrical connection to said pump from above, said pump being located above the common level of water in said aquarium and said container should said container leak, in order to prevent the possibility of electrical short of said pump due to water contact, and a hose connected to said pump and having a discharge ring disposed under said container so that air will rise about said container.

14. A combined aquarium-terrarium, comprising:
a. a terrarium and an aquarium,
b. said aquarium having water outlet means through which water may be discharged and a manually operable closure for said outlet means controlling discharge through said outlet means,
c. said aquarium being disposed higher than said terrarium and said outlet means being operable to discharge by force of gravity into said terrarium when said closure is opened, whereby said terrarium will receive water and food and fish waste from said aquarium as a source of moisture and nourishment,
d. said aquarium having therein extending down from its upper portion an inner container closed at its bottom whereby the water capacity of said aquarium is the space between said inner container and the walls of said aquarium, and
e. said container having a side compartment extending from near its top to near its bottom and partitioned from the remainder of said container, said compartment having at least a lower and an upper opening to the water space in said aquarium whereby water may circulate through said compartment, and a water heater and an electrical connection to said heater from above, said heater being disposed in sid compartment with its electrical connection above the top of said container whereby said container would flood before water could rise to the level of said electrical connection in order to prevent the possibility of electrical short due to water contact.

15. A unit in an aquarium filled with water, comprising:
   a. watertight side and bottom walls defining a compartment and said compartment being at least partly submerged in said water and floating therein by water displacement, said compartment having weight distribution such as to stably float without upsetting,
   b. an electric light positioned in said compartment and an electrical connection to said light from above, said
   c. said walls being at least partly non-opaque so that said aquarium is directly lighted by said light, and outside walls spaced from said watertight walls therearound and forming a shell and providing a space annular in horizontal cross-section between said outside walls and said watertight walls, and said outside walls having at least one lower water ingress opening and having at least one upper water egress opening so that aquarium water can circulate through said annular space, said outside walls being at least partly non-opaque for aquarium lighting by said light, a pump in said compartment and an airline connected to said pump and exhausting near the bottom of said shell with part of said air passing outside said shell and part passing inside said shell thereby providing bubble lighting effects due to bubbles rising inside and outside of said shell and illuminated by said light, and said bubbles passing inside said shell inducing circulation of water out of said egress opening.

16. The subject matter of claim 15 in which there is a filter in said annular space to filter water passing through said annular space.

17. The subject matter of claim 15 in which there is a heater disposed in said annular space with its upper end above the water level in said space and an electrical connection to said upper end of said heater from above, and said shell being non-transparent to obscure viewing of said heater.

18. A unit in an aquarium filled with water, comprising:
   a. watertight side and bottom walls defining a compartment and said compartment being at least partly submerged in said water,
   b. an electrical light positioned in said compartment and an electrical connection to said light from above,
   c. outside walls at least partly spaced from said watertight walls thereby providing a space between said outside walls and said watertight walls,
   d. said outside walls having at least one lower water ingress opening and having at least one upper egress opening so that aquarium water can circulate through said space, said walls being at least partly non-opaque for aquarium lighting by said light, and
   e. a pump and an airline connected to said pump and exhausting near to said water ingress opening with at least part of said air passing inside said space thereby providing bubble lighting effects due to bubbles rising inside said space and illuminated by said light, and said bubbles passing inside said space inducing circulation of water out of said egress opening.

19. The subject matter of claim 18 in which said outside walls are spaced from said watertight walls therearound and said space in horizontal cross-section is annular, said airline also exhausting at a location causing air bubbles to rise outside said outside walls to be illuminated by said light, said outside walls tapering as they pass downwardly so that last-mentioned bubbles will wipe along said outside walls.

20. The subject matter of claim 18 in which there is a filter in said space whereby water passing therethrough will be filtered.

21. The improvement in an aquarium, comprising:
   a. an aquarium having outside walls and bottom walls and having inside walls generally evenly spaced on all sides from said outside walls and forming therebetween on all sides of said inside walls a water-containing space for fish,
   b. said inside walls segregating the space therebetween from said water-containing space providing an air-occupied chamber, and an electric light positioned in said chamber and illuminating said water-containing space through said inside walls which are at least partly non-opaque, said outside walls being at least partly translucent and an electrical connection through said chamber to said light,
   c. means forming a water-containing compartment at least partly segregated from said water-containing space and communicating therewith to receive water from said space and to return water to said space and an electric water heater positioned in said compartment to heat water passing therethrough, and
   d. electrically-powered pump means acting to urge water through said compartment.

22. The subject matter of claim 21 in which said outside walls and said inside walls in horizontal cross-section have the form of concentric circles, and a filter and said pump means acting to urge water past said filter.

23. The improvement in an aquarium, comprising:
   a. an aquarium having outside walls and bottom walls and having inside walls generally evenly spaced on all sides from said outside walls and forming therebetween on all sides of said inside walls a water-containing space for fish,
   b. said inside walls segregating the space therebetween from said water-containing space providing an air-occupied chamber, and an electric light positioned in said chamber and illuminating said water-containing space through said inside walls which are at least partly non-opaque, said outside walls being at least partly translucent, and an electrical connection through said chamber to said light, and
   c. an air pump and an outlet air line from said pump discharging air bubbles in the lower portion of said water-containing space to bubble up through said space and part the light rays from said light producing optical effects.

* * * * *

UNITED STATES PATENT OFFICE
CERTIFICATE OF CORRECTION

PATENT NO. : 4,026,243

DATED : May 31, 1977

INVENTOR(S) : Quenton W. Jessop, III

It is certified that error appears in the above-identified patent and that said Letters Patent are hereby corrected as shown below:

Column 11, line 6, correct "sid" to read -- said --;
and Column 11, line 22, delete "said" and insert -- and --.

Signed and Sealed this

Twenty-seventh Day of September 19

[SEAL]

Attest:

RUTH C. MASON
Attesting Officer

LUTRELLE F. PARKER
Acting Commissioner of Patents and Tradema